United States Patent
Park et al.

(10) Patent No.: US 9,274,663 B2
(45) Date of Patent: Mar. 1, 2016

(54) METHOD OF DETECTING TOUCH AND APPARATUS FOR DETECTING TOUCH USING THE SAME

(71) Applicant: Anapass Inc., Seoul (KR)

(72) Inventors: Joon Bae Park, Seoul (KR); Jong Hwa Lee, Seoul (KR); Ha Sun Song, Seoul (KR); Woo Hyoung Seo, Seoul (KR)

(73) Assignee: ANAPASS INC., Seoul (KR)

( * ) Notice: Subject to any disclaimer, the term of this patent is extended or adjusted under 35 U.S.C. 154(b) by 63 days.

(21) Appl. No.: 14/259,248

(22) Filed: Apr. 23, 2014

(65) Prior Publication Data

US 2014/0320449 A1 Oct. 30, 2014

(30) Foreign Application Priority Data

Apr. 25, 2013 (KR) .................. 10-2013-0046244

(51) Int. Cl.
*G06F 3/045* (2006.01)
*G06F 3/044* (2006.01)

(52) U.S. Cl.
CPC ...... *G06F 3/044* (2013.01); *G06F 2203/04104* (2013.01)

(58) Field of Classification Search
CPC ..... G06F 3/0416; G06F 3/044; G06F 3/0488; G06F 2203/04104; G06F 2203/04111
See application file for complete search history.

(56) References Cited

U.S. PATENT DOCUMENTS

| | | | | |
|---|---|---|---|---|
| 4,707,845 A * | 11/1987 | Krein | ................... | G06F 3/0418 178/18.05 |
| 5,053,757 A * | 10/1991 | Meadows | ................ | G06F 3/044 341/22 |
| 5,565,658 A * | 10/1996 | Gerpheide | ............. | G06F 3/044 178/18.02 |
| 6,028,594 A * | 2/2000 | Inoue | ................... | G06F 3/0416 345/159 |
| 7,920,129 B2 | 4/2011 | Hotelling et al. | | |
| 8,493,330 B2 * | 7/2013 | Krah | ...................... | G06F 3/044 178/18.06 |
| 2011/0061948 A1 * | 3/2011 | Krah | ..................... | G06F 3/0418 178/18.01 |
| 2011/0210941 A1 * | 9/2011 | Reynolds | ................ | G06F 3/044 345/174 |
| 2014/0320450 A1 * | 10/2014 | Lee | ........................ | G06F 3/044 345/174 |

* cited by examiner

*Primary Examiner* — Joe H Cheng
(74) *Attorney, Agent, or Firm* — Paratus Law Group, PLLC

(57) ABSTRACT

Disclosed are an apparatus for detecting touch and a method for detecting touch with reduced effect of noise. The apparatus includes a signal source configured to generate a variable frequency signal changed from a starting frequency to an ending frequency, a touch panel including a plurality of driving electrodes and a plurality of sensing electrodes, wherein the variable phase signal is applied to one of the plurality of driving electrodes, and the sensing electrode outputs a touch signal that is modulated by the variable frequency signal, a demodulation unit configured to demodulate the touch signal using the variable frequency signal, and an accumulation unit configured to accumulate the demodulated touch signal to detect the touch.

19 Claims, 6 Drawing Sheets

METHOD OF DETECTING TOUCH AND APPARATUS FOR DETECTING TOUCH USING THE SAME

CROSS-REFERENCE TO RELATED APPLICATION

This application claims priority to and the benefit of Korean Patent Application No. 10-2013-0046244 filed on Apr. 25, 2013, the disclosure of which is incorporated herein by reference in its entirety.

BACKGROUND

1. Field of the Invention

The present invention relates to a method for detecting touch and an apparatus for detecting touch using the same.

2. Discussion of Related Art

As detection methods currently used in touch screens, a resistance film method, a surface ultrasound method, and a capacitance method are mainly used, and the capacitance method makes multi-touch detection possible and has excellent durability, visibility, and the like, and therefore there is a trend of adapting the capacitance method as a main input means of portable mobile devices.

A touch screen of the capacitance method recognizes a user input by detecting changes in an electric charge amount that is charged into capacitive sensors on a touch screen panel by user interference, and is classified as a self-capacitive touch screen or a mutual-capacitive touch screen in accordance with an electric charge storage method. The self-capacitive touch screen includes a single conductor for each capacitive sensor so as to form a charged surface with a reference ground outside the touch screen panel, whereas the mutual-capacitive touch screen enables two electric conductors on the touch screen panel to mutually form a charged surface so as to function as a single capacitive sensor.

A general self-capacitive touch screen uses an X/Y orthogonal type conductor arrangement, and in this case, each capacitive sensor functions as a line sensor, and therefore only one piece each of X-detection information and Y-detection information is provided from each of an X-line sensor group and a Y-line sensor group when detecting the touch screen. Therefore, the general self-capacitive touch screen makes detection and tracking of a single touch possible, but cannot support a multi-touch. The mutual-capacitive touch screen also uses an X/Y orthogonal type conductor arrangement but each capacitive sensor is configured in the form of a grid sensor for each position orthogonal to the conductor. The mutual-capacitive touch screen is different from the self-capacitive touch screen in that reactions of all grid sensors are independently detected when detecting a user input on the touch screen. Each grid sensor corresponds to one pair of X/Y coordinates and provides mutually independent reaction results, and therefore, in a mutual-charged touch screen, a multi-touch of a user may be detected and tracked by extracting user input information from an X/Y-detection information set provided from a set of X/Y grid sensors.

A configuration of a conductor of a general mutual-capacitive touch screen panel and a detection method thereof are as follows. First electrodes including conductors extending in any one direction and second electrodes including conductors extending in a direction orthogonal to the first electrodes form a mutual-capacitive sensor by a dielectric material between the two electrodes. A capacitance C of the mutual-capacitive sensor is defined as $C=\in*a/d$ when a distance between two electrodes is "d," an area of a charged surface is "a," and an equivalent dielectric constant of all dielectric materials between the charged surfaces is "$\in$," and has a relationship of $Q=CV$ with an electric charge amount Q charged into the sensor and a potential difference (voltage) V applied to two electrodes/charged surfaces. When a user approaches the sensor, interference with respect to an electric field formed between the two electrodes occurs to prevent electric charge from being stored in the sensor, and therefore an electric charge amount charged into the sensor is reduced resulting in a reduction in capacitance. This may be understood as being caused by changes in the capacitance due to changes in the equivalent dielectric constant between the charged surfaces by the user's approach, but a reduction in electric charge amount/storage amount due to a part of the electric field between the charged surfaces being shunted by the user's approach is an actual physical phenomenon. When an AC voltage source is connected to the first electrode to apply an AC waveform to one charged surface of the sensor, variation ($\Delta Q$) in the charge amount corresponding to $\Delta Q=C\Delta V$ with respect to C which varies in accordance with a degree of the user's approach occurs, and a read-out circuit connected to the second electrode converts the variation into a current or a voltage. Such converted information is generally subjected to signal processing operations such as noise filtering, demodulation, digital conversion, accumulation, and the like to be used in a coordinate tracking algorithm and a gesture recognition algorithm. As a prior patent concerning such a capacitive touch-sensitive panel, U.S. Pat. No. 7,920,129 is disclosed.

A signal source applies electric signals to a driving electrode of a touch panel so that an object shunts an electric field flux formed in the driving electrode and a sensing electrode, and a change in a current occurs in the sensing electrode in accordance with a change in the electric field flux due to the shunt. A signal conversion unit connected to the sensing electrode detects the change in the current to determine presence/absence of touch by the object. When noise flows into the current which is required to be detected in order to detect the touch, it may affect information detection such as touch coordinates and the like, resulting in occurrence of an error in information such as detected coordinates and the like.

Various kinds of noises flow into the touch panel. As an example, when an LCD display is disposed below the touch panel, LCD noise due to a Vcom voltage of the LCD may affect the touch panel. Noise radiated from the LCD display may be prevented from flowing into the touch panel by connecting the remaining driving electrodes other than the driving electrode to which electric signals are applied to a low impedance source to form the electric field flux among the driving electrodes formed in the touch panel. In addition, various kinds of noises flow through an object that applies a touch input, and the noises flowing through the object are radiated from a large number of noise sources such as fluorescent lights, lighting equipments and the like and collected by human bodies to be applied to a panel. Noise radiated from a common electrode of the above-described LCD is shielded by the driving electrodes to minimize effects of the noise, but noise flowing through the object cannot be shielded.

In addition, noise having a large frequency difference with signals which are applied in order to drive the touch panel may be removed by performing filtering on the noise, but noise having the same frequency as or an adjacent frequency to the signals which are applied in order to drive the touch panel cannot be removed by performing the filtering on the noise.

In the related arts, touch coordinates are obtained by driving the touch panel using three mutually different signals having three discrete frequencies which are arbitrarily extracted, the obtained touch coordinates are arithmetically operated by performing median filtering in which an intermediate value is used by discarding a maximum value and a minimum value of the obtained result, majority selection filtering in which a result exhibited most frequently in the obtained touch coordinates is used, average selection filtering in which an average value from the obtained result is used, or the like is performed, and then further processing is performed. However, in such related arts, signal processing should be performed by the number of selected frequencies, and therefore power consumption is increased in the signal processing several times, and a time required for obtaining the touch coordinates is increased.

SUMMARY OF THE INVENTION

The embodiment of present invention is directed to a method for detecting touch that may reduce effects of noise having a constant frequency even when the noise flows in and an apparatus for detecting touch using the same. In addition, the present invention is directed to a method for detecting touch that may reduce effects of noise having an adjacent frequency to signals for driving a touch panel even when the noise flows in and an apparatus for detecting touch using the same.

According to an aspect of the embodiment of present invention, there is provided an apparatus for detecting touch comprising: a signal source configured to generate a variable frequency signal changed from a starting frequency to an ending frequency; a touch panel including a plurality of driving electrodes and a plurality of sensing electrodes, wherein the variable phase signal is applied to one of the plurality of driving electrodes, and the sensing electrode outputs a touch signal that is modulated by the variable frequency signal; a demodulation unit configured to demodulate the touch signal using the variable frequency signal; and an accumulation unit configured to accumulate the demodulated touch signal to detect the touch.

According to another aspect of the embodiment of present invention, there is provided a method for detecting touch: generating a variable frequency signal changed from a starting frequency to an ending frequency; outputting a touch signal modulated by the variable frequency signal in such a manner that the variable frequency signal is applied to any one of driving electrodes and a sensing electrode detects touch by an object; demodulating the touch signal using the variable frequency signal; and accumulating the demodulated signal.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
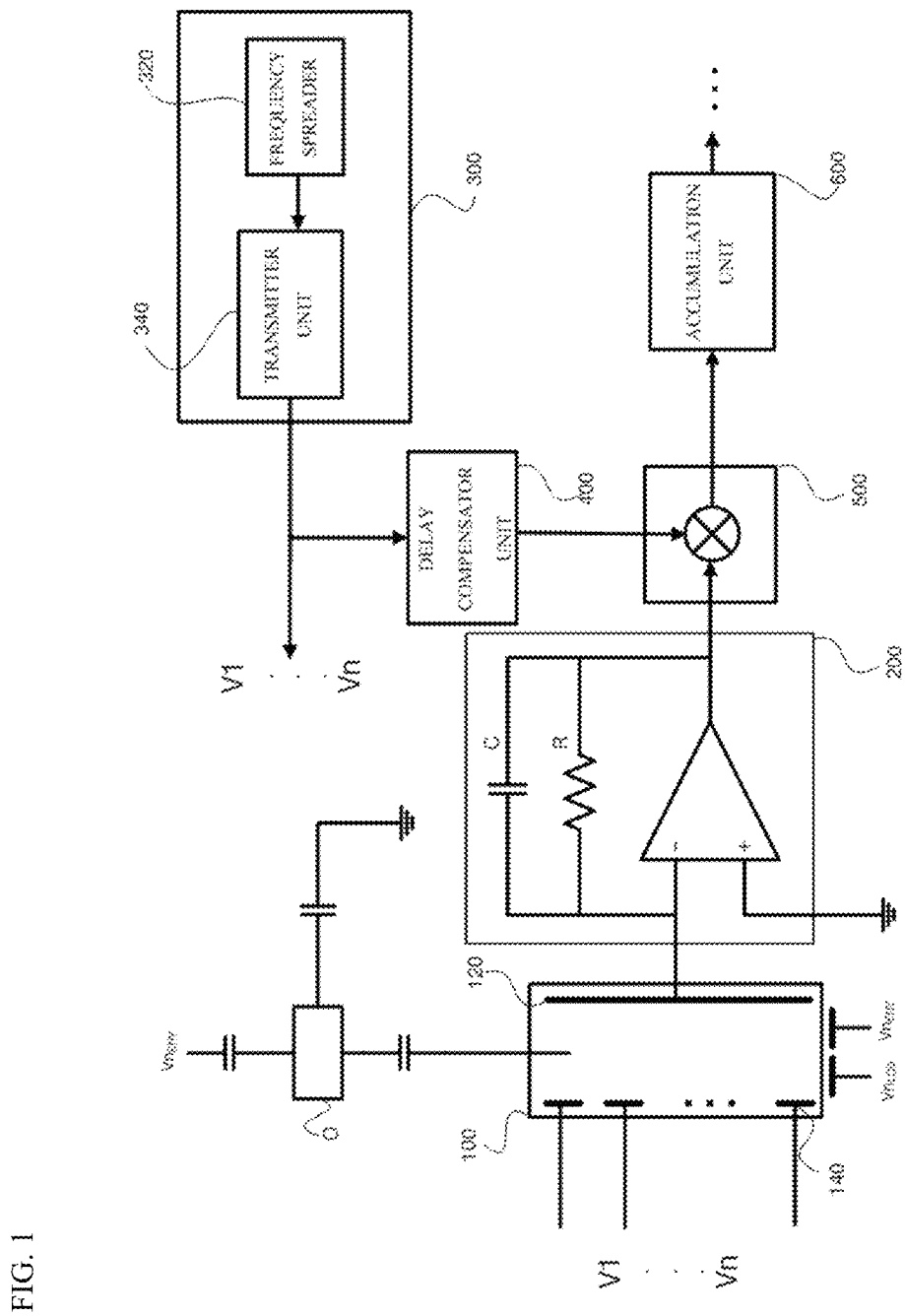
FIG. 1 is a schematic block diagram illustrating a configuration of an apparatus for detecting touch according to an embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
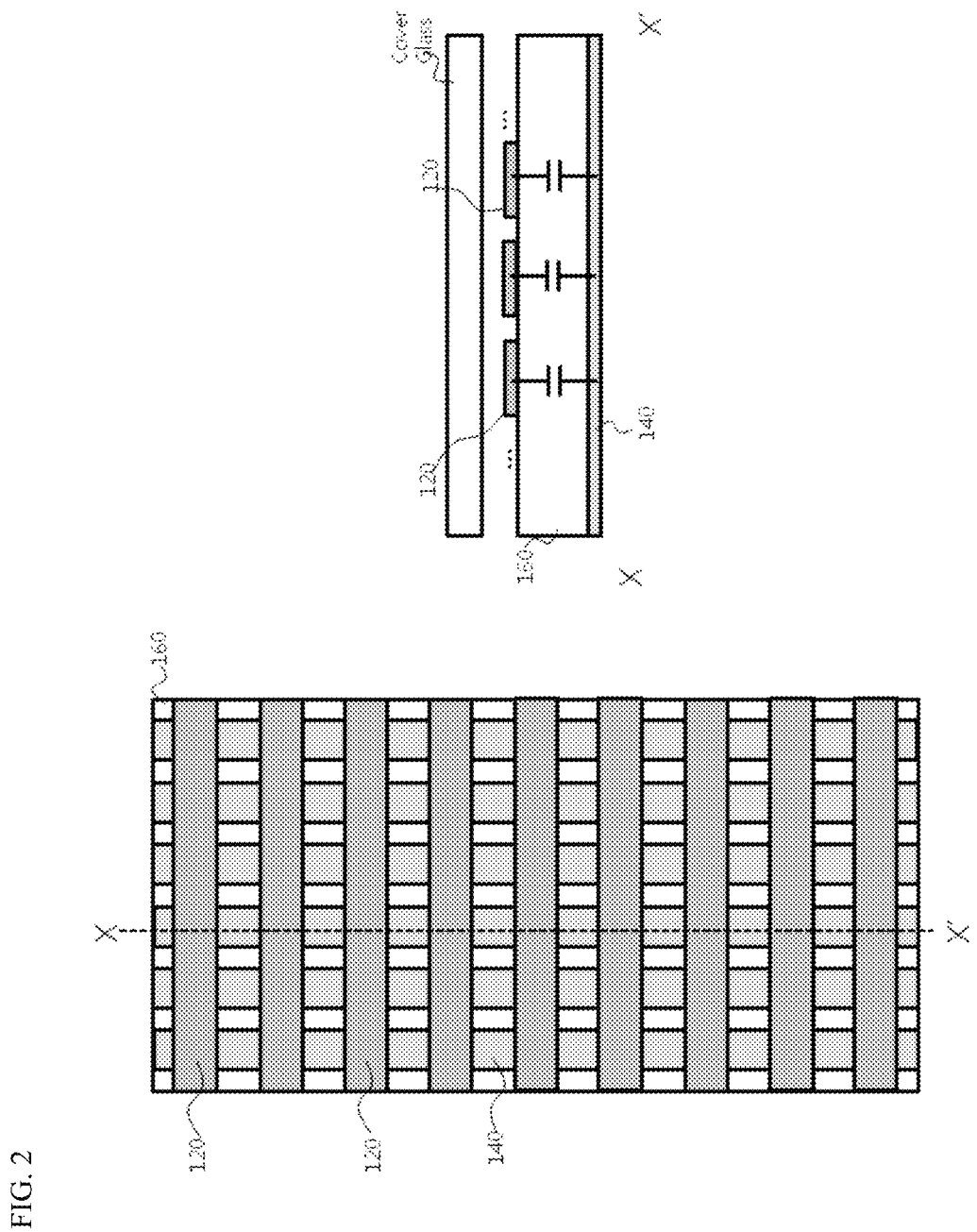
FIG. 2 is a schematic diagram illustrating a structure of a touch panel.

Hereinafter, embodiments of the present invention will be described with reference to the accompanying drawings. FIG. 1 is a schematic block diagram illustrating a configuration of an apparatus for detecting touch according to an embodiment of the present invention. FIG. 2 is a schematic diagram illustrating a structure of a touch panel 100. Referring to FIGS. 1 and 2, the touch panel 100 includes a sensing electrode 120, a driving electrode 140, and a substrate 160. In an embodiment, the substrate 160 is made of a transparent dielectric, and a cover glass is formed on an upper surface of the substrate to transmit images displayed by a display device such as a liquid crystal display (LCD), an active matrix organic light emitting diode (AMOLED) display, or the like which is located on a rear surface of the substrate. As an example, the substrate is made of glass. The sensing electrodes 120 disposed on the substrate 160 and the driving electrodes 140 are all made of a transparent material to transmit and display images while detecting an object. As another embodiment, the substrate 160 is made of an opaque material to simply detect only touch by an object (0).

An object that enables a user to apply an input to a touch panel is defined as an object. Such an object refers to an object that can apply a touch input to the touch panel 100 by shunting an electric field flux formed in first and second electrodes such as a finger, a hand, a palm, or a stylus. However, this is merely for describing the object, and is not intended to limit a range of the object. Accordingly, the object can be a cheek or a toe of a user.

A plurality of sensing electrodes 120 which are disposed to extend in a first direction are positioned on the upper surface of the substrate 160. The driving electrodes 140 which extend in a second direction orthogonal to the first direction to be arranged in parallel with each other are positioned on a rear surface of the substrate 160. The driving electrodes 140 form a mutual capacitor together with the sensing electrodes. As an example, the driving electrodes 140 and the sensing electrodes 120 are made of a transparent conductive material to transmit images displayed by a display device positioned on the rear surface of the substrate as described above. According to an embodiment, the driving electrodes 140 and the sensing electrodes 120 may be made of a transparent material having conductivity such as indium tin oxide (ITO), indium zinc oxide (IZO), aluminum zinc oxide (AZO), and indium cadmium oxide (ICO). According to another embodiment, the driving electrodes 140 and the sensing electrodes 120 may be made of carbon nano tubes (CNTs). CNTs may flow a current having a higher density compared to a transparent conductive material such as ITO or the like.

Figure 3:
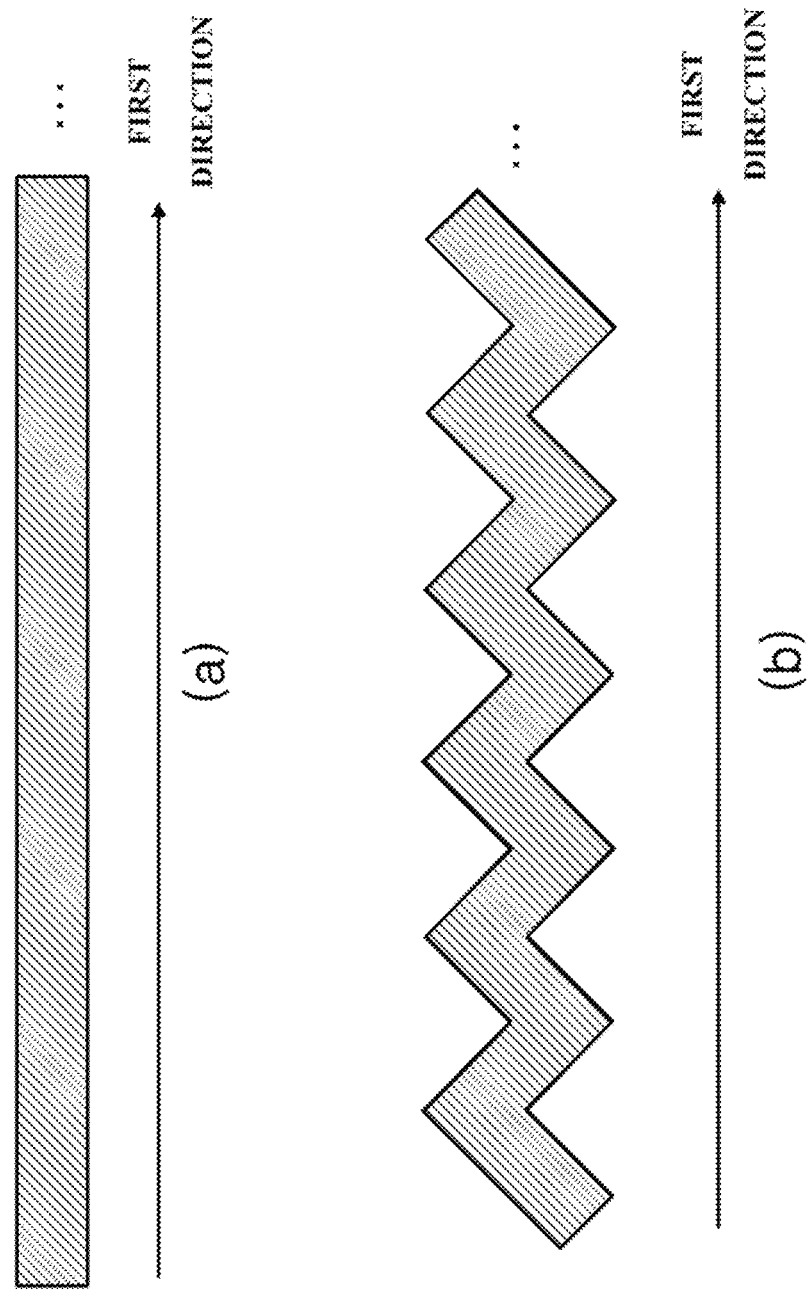
FIG. 3 is a diagram illustrating a structure of a touch panel.

Extending in the first direction in the present specification refers to being formed linearly in the first direction as shown in FIG. 3A, and also includes being formed in the first direction in a zigzag form as shown in FIG. 3B. In addition, although not shown, extending in the first direction in the present specification includes being formed in the first direction in the form of a meandering curved line rather than a zigzag.

The sensing electrodes 120 detect signals generated by touch of an object, and apply the detected signals to a signal conversion unit 200. The signal conversion unit 200 includes a charge amplifier, and the charge amplifier includes an operational amplifier having an inverting input terminal electrically connected to the touch panel 100, a non-inverting input terminal electrically connected to a ground potential, and an output terminal electrically connected to the inverting input terminal so as to feed outputs back to the inverting input terminal. Here, resistance (R) and a capacitor (C) are electrically connected to the charge amplifier on a path which is fed back from the output terminal of the operational amplifier to the inverting input terminal. A potential of the sensing electrode 120 is electrically connected to the inverting input terminal of the charge amplifier, and therefore the potential of the sensing electrode 120 may be maintained in the same manner as a potential of the non-inverting input terminal by a virtual short principle of the operational amplifier, and a current signal is converted into a voltage signal by the capacitor (C) positioned on the feedback path to be output.

Figure 4:
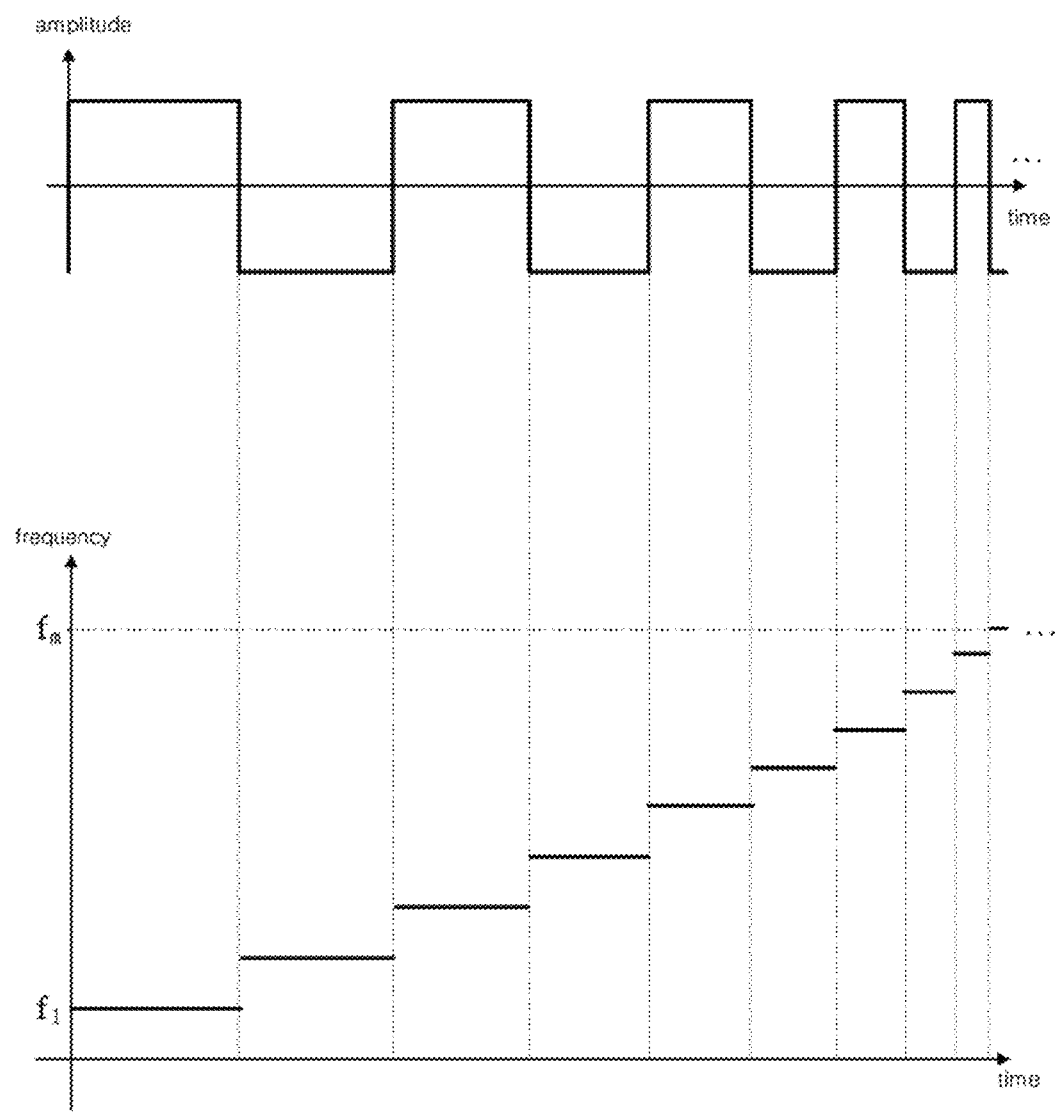
FIGS. 4 and 5 are diagrams illustrating an embodiment of variable frequency signals which are generated by a signal source.
Figure 5:
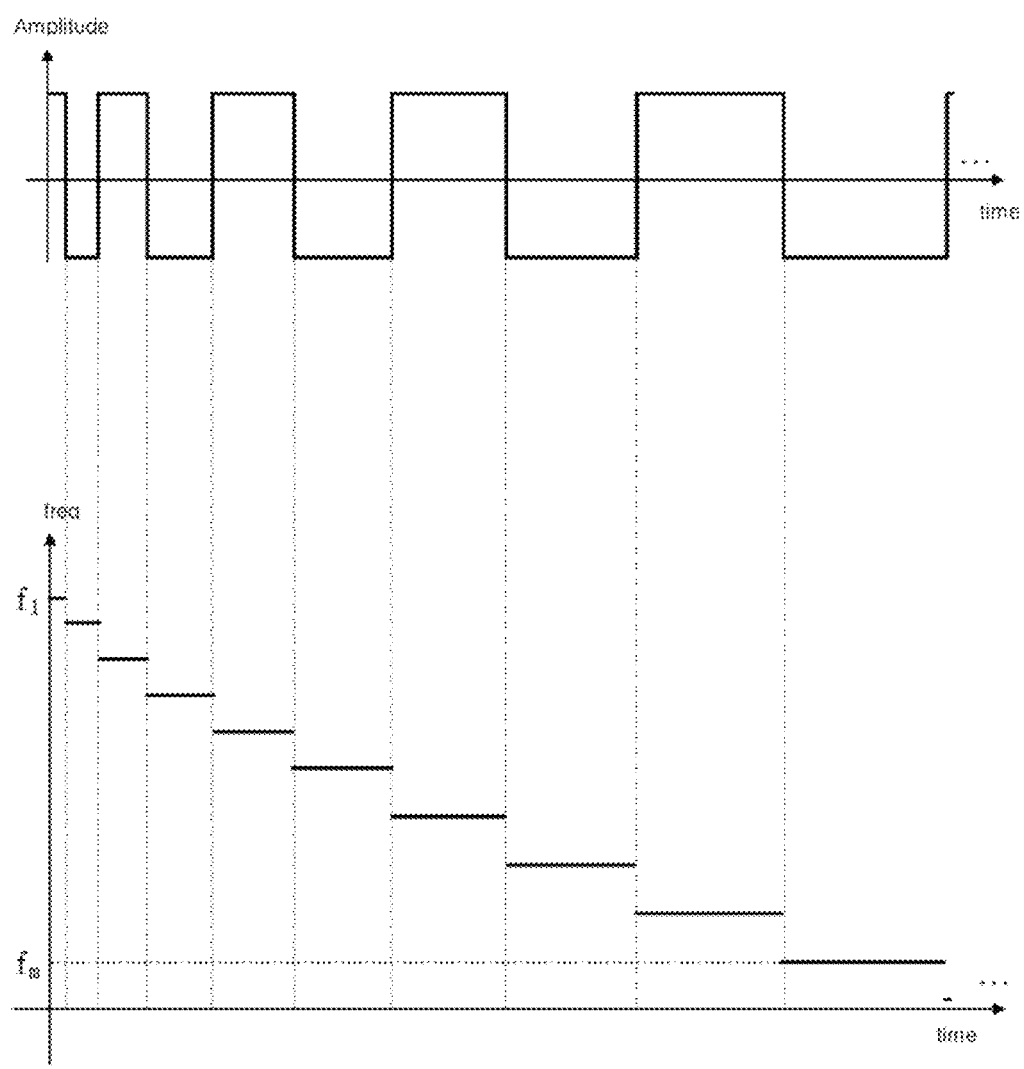

FIGS. 4 and 5 are diagrams illustrating an example of a waveform of a variable frequency signal generated by a signal source 300 and a frequency change over time. Referring to FIGS. 1, 4, and 5, the signal source 300 generates a variable frequency signal that is changed from a starting frequency f1 to an ending frequency f2. In an embodiment, the signal source 300 includes a frequency spreader 320 that outputs the variable frequency signal whose frequency is changed from the starting frequency to the ending frequency and a transmitter unit 340 that outputs the variable frequency signal formed by the frequency spreader 320 to the touch panel 100 and the delay compensator unit 400. According to an embodiment, as shown in FIG. 4, the signal source 300 generates signals whose frequencies are increased from a starting frequency $f_1$ to an ending frequency $f_m$. In another embodiment, as shown in FIG. 5, the signal source 300 generates signals whose frequencies are reduced from the starting frequency $f_1$ to the ending frequency $f_m$. As an example, the frequency from the starting frequency $f_1$ to the ending frequency $f_m$ may be linearly changed, and as another example, the frequency the starting frequency $f_1$ to the ending frequency $f_m$ may be non-linearly changed, as necessary.

According to an embodiment, as shown in FIGS. 4 and 5, in the variable frequency signal, the frequency is changed whenever a phase is changed by 180°. According to another embodiment which is not shown, in the variable frequency signal, the frequency is changed whenever the phase is changed by 360°. That is, in the variable frequency signal which is generated and applied by the signal source 300, the frequency may be changed for each phase change corresponding to n times 180° (180×n°, n being a natural number).

According to an embodiment, the variable frequency signal generated by the signal source may be any one of a step wave, a rectangular pulse, a sinusoidal pulse, a triangular pulse, and a linear superposition thereof.

When the signal source 300 applies the variable frequency signal to the touch panel 100, the applied variable frequency signal is delayed for a predetermined time due to a resistance component on a signal transmission path, a parasitic capacitance, or an RC delay by a capacitor formed between the driving electrode 120 and sensing electrode 140 of the touch panel and also delayed due to a delay in a process in which the signal conversion unit 200 converts a current signal output to the signal conversion unit 200 by the touch panel 100 into a voltage signal, and inputs the voltage signal to the demodulation unit 500.

The delay compensator unit 400 delays the signal applied by the signal source 300 for a delay time from a point in time at which the signal source 300 applies signals to the touch panel to a point in time at which the corresponding output is input to the demodulation unit 500. When the signal source 300 applies the variable frequency signal to the touch panel 100, the variable frequency signal is delayed for a predetermined time and input to the demodulation unit 500, as described above. When the demodulation unit 500 demodulates the touch signal using the variable frequency signal that is not delayed, a phase difference with the variable frequency signal that has modulated the touch signal occurs and it cannot obtain an accurate touch signal by performing demodulation. Therefore, the delay compensator unit 400 delays the variable frequency signal applied from the signal source 300 for a delay time required from a period of time in which the variable frequency signal is applied to the touch panel to a period of time in which the signal conversion unit 200 outputs the modulated touch signal to the demodulation unit 500, and outputs the delayed signal to the demodulation unit 500.

The demodulation unit 500 demodulates the touch signal modulated by the variable frequency signal which is applied to the touch panel 100 by the signal source 300. As described above, the delay compensator unit 400 delays the signal applied to the delay compensator unit 400 for a delayed time until the variable frequency signal output by the signal source is applied to the demodulation unit 400 through the touch panel 100 and the signal conversion unit 200, and outputs the delayed signal to the demodulation unit, and therefore the demodulation unit 400 demodulates the same signal as the modulated signal to obtain the touch signal. In addition, noise that flows into the touch panel is input to the demodulation unit 400 through the signal conversion unit 200, and therefore the noise is also demodulated to be applied to the accumulation unit.

The accumulation unit 600 accumulates the demodulated touch signal. By accumulating the demodulated touch signal, effects of the noise are reduced as will be described later, thereby obtaining more accurate touch coordinates. According to an embodiment, the accumulation unit 600 includes an integrator.

Operations of the apparatus for detecting touch which has the above-described configuration will be described with reference to FIGS. 1, 4, and 5. When the signal source 300 applies the variable frequency signal to the driving electrode 120 of the touch panel 100, the driving electrode 120 forms an electric field flux with each of the sensing electrodes 140 for forming a mutual capacitor. The sensing electrode 120 applies a current formed by the electric field flux to the signal conversion unit 200. When an object (O) touches the touch panel 100, the electric field flux formed by the driving electrode 120 and the sensing electrode 140 is shunted by the object (O). Thus, when the object (O) touches the touch panel, the electric field flux of the mutual capacitor formed by the driving electrode and the sensing electrode is changed, and modeling of the change in the electric field flux to a change in a dielectric constant of the capacitor due to the touch of the object is possible. Thus, when the capacitor is a flowing current i, the following Equation 1 is obtained.

$$i = C\frac{dV}{dt},$$ [Equation 1]

$\begin{cases} V \text{ denotes a driving signal applied to a driving electrode} \\ C \text{ denotes a capacitor} \end{cases}$ Thus, when the touch by the object occurs, a current change in accordance with a capacitance change of the capacitor occurs. The sensing electrode 140 applies the changed current to the signal conversion unit 200, and the signal conversion unit 200 converts the applied current signal into a voltage signal.

A frequency of the touch signal formed in such a manner that the object (O) moves in the touch panel is within a band of about several Hz to several hundreds of Hz. Such a signal is modulated by the variable frequency signal applied to the touch panel by the signal source 300 to be up-converted into a frequency band of the variable frequency signal. Thus, the variable frequency signal includes m frequencies such as $f_1$, $f_2, \ldots,$ and $f_m$ which are mutually different, and the touch signal generated by the object is modulated into m frequencies which are mutually different by the variable frequency signal. It should be noted that such a modulated touch signal is not m modulated touch signals obtained by performing scanning on one sensing electrode m times using m signals having mutually different frequencies, but a single modulated touch signal obtained by performing scanning on one sensing electrode once using a single variable frequency signal including m frequencies which are mutually different.

Noise that flows into the touch panel 100 is superimposed with the modulated touch signal to be applied to the signal conversion unit 200, and the signal conversion unit 200 converts a signal in which the modulated touch signal and the noise are superimposed into a voltage signal.

The demodulation unit 500 demodulates the signal in which the modulated touch signal output by the signal conversion unit 200 and the noise are superimposed into the variable frequency signal. Since the signal used in the demodulation is the variable frequency signal which is delayed by the delay compensator unit 400 for a delay time from a point in time at which the signal source 300 applies the variable frequency signal to the touch panel 100 to a point in time at which the signal conversion unit 200 outputs the variable frequency signal, the signal used in the demodulation in the demodulation unit 500 has the same phase as the signal used in modulation of the touch signal with a low frequency which is generated by the object. Thus, the touch signal modulated into m mutually different frequencies such as $f_1$, $f_2, \ldots,$ and $f_m$ is demodulated into the same signal as the signal used in the modulation to be applied to the accumulation unit 600.

In addition, noise in addition to the touch signal generated by the object is also mixed with the variable frequency signal to be down-converted into a baseband. When the variable frequency signal which is generated by the signal source 300 and applied to the demodulation unit 500 includes signals having m mutually different frequencies such as $f_1$, $f_2, \ldots,$ and $f_m$, and a frequency $f_N$ of the noise is adjacent to any one frequency $f_2$ among frequencies of the variable frequency signals, the noise is mixed with a frequency component included in the variable frequency signal to be down-converted into a baseband, and then applied to the accumulation unit 600.

The touch signal obtained by being demodulated by variable frequency signal having m mutually different frequencies such as $f_1$, $f_2, \ldots,$ and $f_m$ and the down-converted noise component are applied to the accumulation unit 600, and the accumulation unit performs an accumulation operation on the demodulated touch signal and down converted noise to detect touch using the accumulation result. According to an embodiment, the accumulation unit includes an integrator, and performs an accumulation operation on the touch signal obtained by being demodulated into m frequencies and the noise down-converted into the baseband.

Power of the accumulated signals is a sum of a power component of the signal generated in such a manner that the touch signals demodulated into m mutually different frequencies are accumulated and a power component of the noise. Power of the touch signal obtained by being modulated into any one frequency included in the variable frequency signal and then demodulated is larger than power of the noise. Thus, a sum of power components of the touch signals obtained by being modulated into m frequencies included in the variable frequency signal and then demodulated is even larger than power components of the noise, and therefore effects of the noise may be reduced when detecting touch coordinates using the result obtained by performing the accumulation operation.

Accordingly, using a configuration in which touch coordinates are obtained by accumulating demodulated signals obtained in such a manner that one variable frequency signal having mutually different frequencies is applied to the touch panel and the touch signal by the object is modulated and demodulated, effects of the noise may be reduced, and accurate touch coordinates may be detected.

According to the present embodiment, since scanning is performed on the sensing electrode once using a single signal having a plurality of frequencies, touch coordinates with reduced effects of the noise may be obtained only through one iteration of scanning to rapidly extract coordinates. In addition, since only one iteration of scanning and one iteration of signal processing are performed, there is no need to perform a plurality of iterations of signal processing, and therefore power consumed in a process of signal processing may be reduced.

In addition, when driving the touch panel using the variable frequency signal having spread frequencies within a predetermined band according to the present embodiment rather than only one frequency, electromagnetic interference (EMI) is reduced, thereby reducing influences on a human body and other electronic devices.

Figure 6:
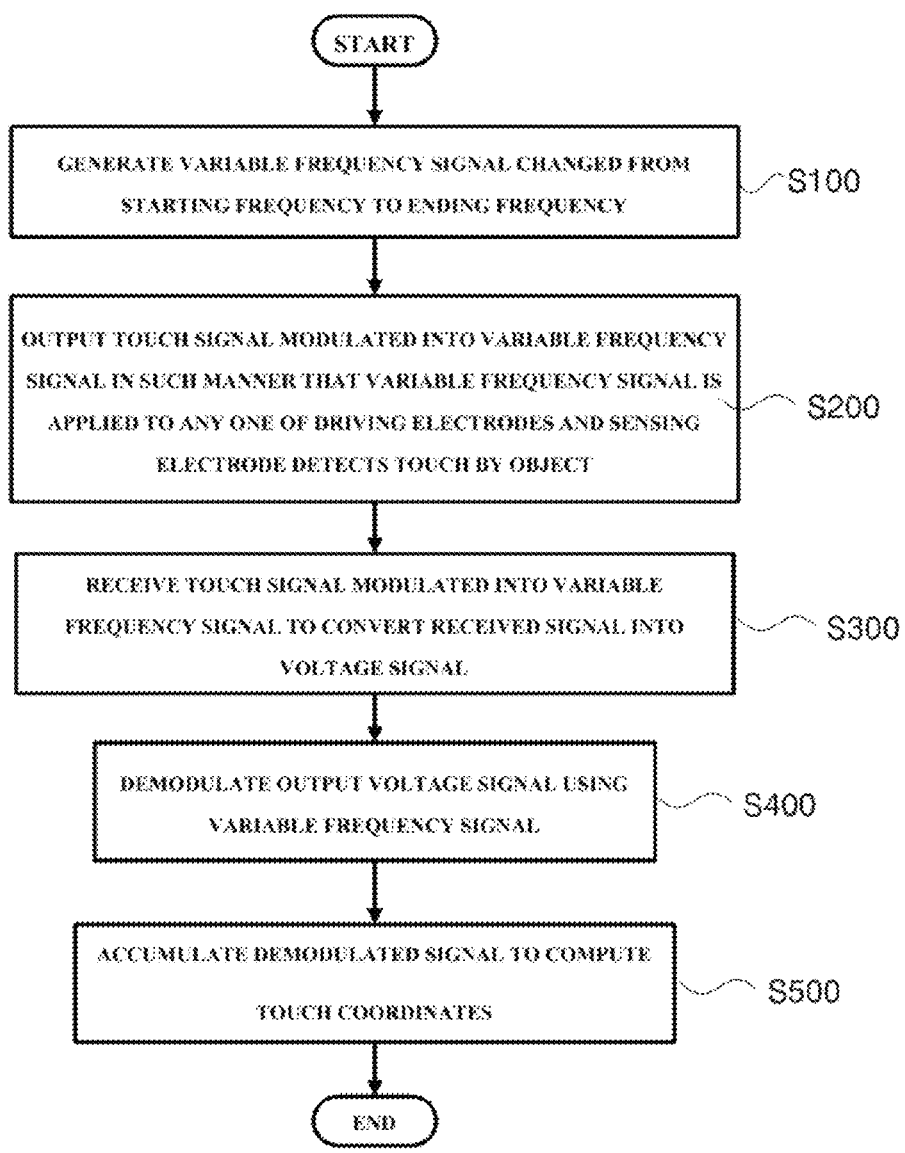
FIG. 6 is a flowchart illustrating a method for detecting touch according to an embodiment of the present invention.

Hereinafter, a method for detecting touch according to an embodiment of the present invention will be described with reference to FIG. 6. For clear and concise description, repeated descriptions with the above-described embodiment can be omitted. FIG. 6 is a flowchart illustrating a method for detecting touch with reduced effect of noise according to an embodiment of the present invention. Referring to FIG. 6, in operation S100, the variable frequency signal changed from the starting frequency to the ending frequency is generated. The variable frequency signal modulates a touch signal generated when an object touches a touch panel in such a manner that the variable frequency signal is applied to the touch panel. A frequency of the variable frequency signal is changed from the starting frequency to the ending frequency while performing scanning on any one sensing electrode.

In operation S200, the touch panel outputs the touch signal modulated by the variable frequency signal. A frequency of the signal applied to the touch panel using the object by a user is a frequency within a baseband. Thus, when generating the modulated touch signal obtained by modulating a signal with a baseband frequency using the variable frequency signal, and then demodulating the generated touch signal into the variable frequency signal again, the touch signal in the baseband may be restored.

The touch panel includes a plurality of mutual capacitors including the driving electrode connected to the signal source for applying the variable frequency signal and the sensing electrode connected to the signal conversion unit. Thus, the signal source applies a variable frequency voltage that is an AC signal through the driving electrode, and the sensing electrode outputs a current signal that is generated by touch of the object and modulated into the variable frequency signal to the signal conversion unit.

In operation S300, the signal modulated into the variable frequency signal is detected and the detected signal is converted into a voltage signal. In a state of maintaining a potential of the sensing electrode constant using a charge amplifier, a voltage corresponding to a current applied to both ends of the capacitor may be generated by applying a current to the capacitor. The touch signal modulated into the variable frequency signal through the above-described process has the form of a voltage signal.

In operation S400, the signal modulated into the voltage signal is demodulated using the variable frequency signal. By performing the demodulation operation as described above, the touch signal may be down-converted into an original frequency band. According to an embodiment, by performing the accumulation operation in operation S500, effects of noise that flows into the touch panel may be minimized.

The variable frequency signal used in the demodulation operation in S400 should be the same as the variable frequency signal that modulates the touch signal generated when a user touches the touch panel using the object. Thus, a reference frequency signal used in the demodulation operation is a signal delayed for a delay time from a point in time at which the reference frequency signal is applied to the touch panel to a point in time at which the reference frequency signal is output from the signal conversion unit.

In operation S500, touch coordinates are arithmetically operated by accumulating the demodulated signal. The demodulated signal is a touch signal obtained by being demodulated into mutually different frequencies with the down-converted noise component. Here, the accumulation operation is performed on the demodulated signal, and touch is detected using result of the accumulation operation.

A sum of a power component $P_{touch}$ of the signal generated in such a manner that the touch signal demodulated into m mutually different frequencies is accumulated and a noise power component $P_{noise}$ is a total power component of the signal that is output by performing the accumulation operation, and a power component $P_{touch}$ of the touch signal that is output through an arithmetic operation in the accumulation unit is larger than the noise component $P_{noise}$ ($P_{touch} \gg P_{noise}$), and therefore effects of the noise may be minimized when detecting the touch coordinates using the result of the accumulation operation.

Therefore, through a configuration in which a single variable frequency signal having mutually different frequencies is applied to the touch panel, the touch signal by the object is modulated and demodulated to accumulate the demodulated signal, and then touch coordinates are obtained, the effects of the noise may be reduced, and accurate touch coordinates may be detected.

As described above, according to the above-described embodiments, occurrence of touch jitter in which the touch coordinates are changed due to effects of noise may be efficiently prevented, and the effects of the noise having the same frequency as or an adjacent frequency to the frequency of the touch driving signal which cannot be removed in the related art may be efficiently reduced, thereby more stably driving the apparatus for detecting touch.

According to the present embodiment, the touch panel is driven with several frequencies spread within a predetermined band, and therefore effects of noise having a specific frequency may be reduced even when the noise flows in. In addition, according to the present embodiment, the effects of noise having a specific frequency that cannot be removed may be reduced by performing filtering, thereby more accurately detect touch coordinates, touch strength, gesture, and the like.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for detecting touch comprising:
 a signal source configured to generate a variable frequency signal changed from a starting frequency to an ending frequency;
 a touch panel including a plurality of driving electrodes and a plurality of sensing electrodes, wherein the variable frequency signal is applied to one of the plurality of driving electrodes, and the sensing electrode outputs a touch signal that is modulated by the variable frequency signal;
 a demodulation unit configured to demodulate the touch signal using the variable frequency signal; and
 an accumulation unit configured to accumulate the demodulated touch signal to detect the touch,
 wherein a frequency of the variable frequency signal is increased or reduced from the starting frequency to the ending frequency.

2. The apparatus of claim 1, further comprising:
 a delay compensator unit configured to receive the variable frequency signal from the signal source, and output delayed variable frequency signal to the demodulation unit, wherein the delayed variable frequency signal has a phase corresponding to a phase of the variable frequency signal used in modulating the touch signal.

3. The apparatus of claim 1, wherein the apparatus further includes a signal conversion unit configured to receive the touch signal to convert the received signal into a voltage signal.

4. The apparatus of claim 3, wherein the accumulation unit includes an integrator.

5. The apparatus of claim 3, wherein the signal conversion unit includes an operational amplifier including an output terminal, an inverting input terminal electrically connected to the touch panel, and a non-inverting input terminal electrically connected to a ground potential, and a charge amplifier to which resistance and a capacitor are electrically connected on a path fed back from the output terminal of the operational amplifier to the inverting input terminal.

6. The apparatus of claim 1, wherein the frequency of the variable frequency signal is linearly increased or reduced from the starting frequency to the ending frequency.

7. The apparatus of claim 1, wherein the frequency of the variable frequency signal is non-linearly increased or reduced from the starting frequency to the ending frequency.

8. The apparatus of claim 1, wherein the signal generated by the signal source is any one of a step wave, a rectangular pulse, a sinusoidal pulse, a triangular pulse, and a linear superposition thereof.

9. The apparatus of claim 1, wherein the signal source includes a frequency spreader configured to form the variable frequency signal and a transmitter unit configured to transmit the variable frequency signal output from the frequency spreader.

10. The apparatus of claim 1, wherein the frequency of the variable frequency signal is changed per a phase change of 180×n° of the variable frequency signal (n being a natural number).

11. A method of detecting touch comprising:
 generating a variable frequency signal changed from a starting frequency to an ending frequency, by forming a signal in which a frequency of the variable frequency signal is increased or reduced from the starting frequency to the ending frequency;
 outputting a touch signal modulated by the variable frequency signal in such a manner that the variable frequency signal is applied to any one of driving electrodes and a sensing electrode detects touch by an object;
 demodulating the touch signal using the variable frequency signal; and
 accumulating the demodulated signal.

12. The method of claim 11, wherein the demodulating the touch signal using the variable frequency signal further includes converting the touch signal into a voltage signal.

13. The method of claim 12, wherein the converting of the touch signal into a voltage signal includes receiving the touch signal to convert the received signal into the voltage signal using an operational amplifier including an operational amplifier including an output terminal, an inverting input terminal electrically connected to the touch panel, and a non-inverting input terminal electrically connected to a ground potential, and a charge amplifier to which resistance and a capacitor are electrically connected on a path fed back from the output terminal of the operational amplifier to the inverting input terminal.

14. The method of claim 11, wherein the demodulating the touch signal includes demodulating the touch signal using a variable frequency signal delayed to have same phase with the variable frequency signal used in modulating the touch signal.

15. The method of claim 11, wherein the accumulating of the demodulated signal includes accumulating the demodulated signal using an integrator.

16. The method of claim 11, wherein the frequency of the variable frequency signal is linearly increased or reduced from the starting frequency to the ending frequency.

17. The method of claim 11, wherein the frequency of the variable frequency signal is non-linearly increased or reduced from the starting frequency to the ending frequency.

18. The method of claim 11, the signal formed in the generating of the variable frequency signal has a rectangular pulse whose frequency is changed.

19. The method of claim 11, wherein the generating of the variable frequency signal includes changing the frequency of the variable frequency signal per a phase change of 180×n° of the variable frequency signal (n being a natural number).

* * * * *